United States Patent Office 2,828,787
Patented Apr. 1, 1958

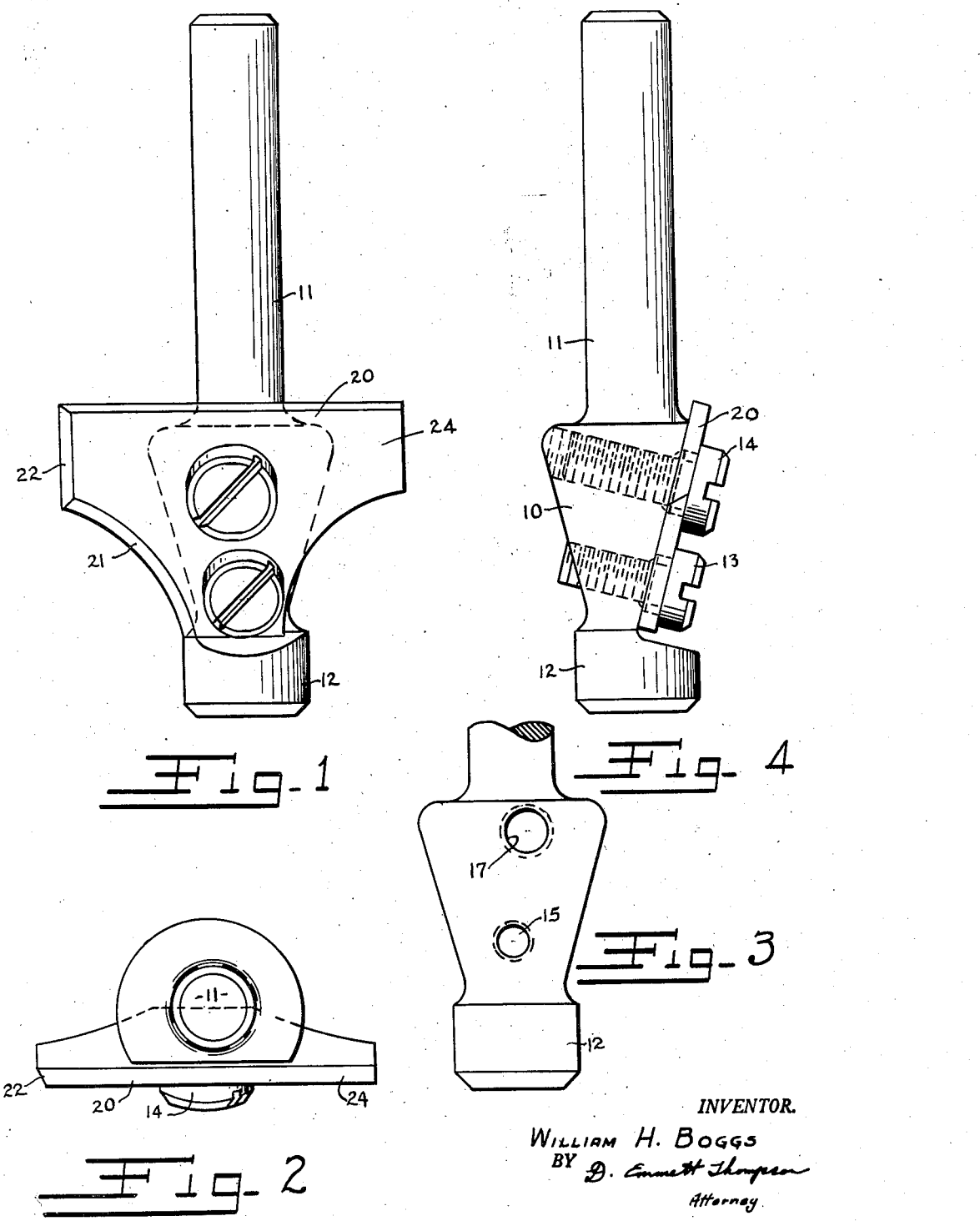

2,828,787

ROTARY CUTTER WITH DETACHABLE BLADE

William H. Boggs, Syracuse, N. Y., assignor to The Porter-Cable Machine Company, Syracuse, N. Y., a corporation of New York Application March 8, 1957, Serial No. 644,887

3 Claims. (Cl. 144—218)

This invention relates to rotary cutters of the type having a body provided with a driving shank and a blade detachably mounted in or on the body.

The invention has as an object a rotary cutter embodying a structure which is particularly simple and economical to manufacture and permitting interchangeable blades to be mounted on the body of the cutter to produce various form cuts on work pieces.

The invention consists in the novel features and in the combinations and constructions hereinafter set forth and claimed.

In describing this invention, reference is had to the accompanying drawings in which like characters designate corresponding parts in all the views.

Figure 1 is a front elevational view of a cutter embodying my invention.

Figure 2 is a top plan view.

Figure 3 is a rear elevational view of the body, looking to the right, Figure 4.

Figure 4 is a side elevational view of the cutter.

The cutter consists of a body portion 10 which is of conical formation and has extending upwardly a driving shank 11. The body is formed at its lower end with a cylindrical portion 12. One side of the body is machined off to provide a flat chordal surface extending upwardly from the cylindrical portion 12 at approximately the axis of the body and diverging outwardly therefrom.

A flat cutting blade 20 is positioned upon the chordal surface and is detachably clamped thereagainst by screws 13, 14.

The screw 13 is threaded into an aperture 15 extending normal to the chordal surface in the lower portion of the conical body and intersects the axis thereof. The upper screw 14 of larger size is threaded into an aperture 17 formed in the upper portion of the conical body and offset relative to the axis thereof, as illustrated in Figure 3 of the drawings.

The cutter is in the form of a flat blade 20, one end of which is formed with one or more ground edges as 21, 22. In the drawing, the cutting edge 21 of the blade is of arcuate formation, and the cutting edge 22 extends parallel to the axis of the cutter. This is a form type cutter for rounding the corner edge of a work piece and/or for cutting a rabbet in the edge of the work piece. The opposite end 24 of the cutter blade extends a shorter distance from the axis of the cutter and serves to balance the opposite cutting end portion but does not engage the work piece.

An important feature of my cutter resides in the inclination of the flat chordal surface on which the cutter 20 is mounted. This inclined surface permits or provides for the lower cylindrical portion 12, which serves as an integral depth guide for the cutter. Further, the inclined blade mounting surface provides a thickened body portion for the upper portion of the form cutter which extends the greatest distance from the axis of the cutter and therefore, encounters the greatest resistance or load during the cutting operation. This thickened portion permits for the use of the larger fastening screw 14 to provide additional clamping force for the upper portion of the cutter blade where it is needed. Further, the inclined blade mounting surface permits the use of smaller form cutting blades—that is, the cutting edge of form cutting blades is closer to the axis of the cutter body, therefore requiring less power to operate the cutter and the body can therefore be formed with a smaller size shank for mounting in smaller size spindle chucks and further, the body is of less weight and has less vibration than cutters wherein the body is simply flattened off on one side providing a parallel blade mounting surface.

The cutter, as will be apparent, is very economical to manufacture and the flat cutting blades 20 can be produced by a punch press operation except for the grinding of the cutting edge, or edges. These cutters are particularly suitable for use with high speed wood routing machines and provide the user, such as a home work shop enthusiast, to have available a series of form cutters at a very small fraction of the cost of such individual cutters formed of solid stock.

What I claim is:

1. A rotary cutter comprising a body having a driving shank extending axially from the upper end thereof, the opposite lower end being formed with a cylindrical portion, an intermediate portion of conical formation converging toward said cylindrical portion, said conical portion being formed with a flat chordal surface extending upwardly from said cylindrical portion and diverging outwardly from the axis of the body, a flat cutting blade positioned on said flat surface and having a cutting edge extending beyond the periphery of said intermediate portion, and means carried by the body and cooperable with said blade for detachably securing said blade to said intermediate portion.

2. A rotary cutter comprising a body having a driving shank extending axially from the upper end thereof, the opposite lower end being formed with a cylindrical portion, the intermediate portion of said body being of conical formation converging toward said cylindrical portion, and the upper end of said intermediate portion being of substantially greater diameter than said cylindrical portion, said conical portion being formed with a flat chordal surface extending upwardly from said cylindrical portion and diverging outwardly from the axis of the body, a flat cutting blade positioned on said flat surface and having a cutting edge extending outwardly beyond the periphery of said intermediate portion, screw means extending through said blade and threading into said intermediate portion and being operable to detachably secure said blade against said flat surface.

3. A rotary cutter comprising a body having a driving shank extending axially from the upper end thereof, the opposite lower end of said body being formed with a cylindrical portion, an intermediate portion of conical formation converging toward said cylindrical portion, said intermediate conical portion being formed with a flat chordal surface extending upwardly from said cylindrical portion at the axis of said body and diverging outwardly therefrom, a flat cutting blade positioned on said flat surface and having a cutting edge extending radially outwardly beyond the periphery of said conical portion, and screw means extending through said blade and threading into said conical portion and being operable to detachably clamp the blade thereagainst.

No references cited